US008917308B2

(12) United States Patent
Kaltsukis

(10) Patent No.: US 8,917,308 B2
(45) Date of Patent: Dec. 23, 2014

(54) VIDEO ALARM SECURITY SYSTEM WITH 3-PARTY 9-1-1 CALLING

(76) Inventor: Calvin Lee Kaltsukis, San Rafael, CA (US)

( * ) Notice: Subject to any disclaimer, the term of this patent is extended or adjusted under 35 U.S.C. 154(b) by 71 days.

(21) Appl. No.: 13/507,729

(22) Filed: Jul. 24, 2012

(65) Prior Publication Data

US 2014/0028783 A1 Jan. 30, 2014

(51) Int. Cl.
*H04N 7/14* (2006.01)

(52) U.S. Cl.
USPC .......................................... 348/14.02; 379/45

(58) Field of Classification Search
USPC ....................... 379/37, 38, 40, 42, 45, 47, 48; 348/14.05, 14.02
See application file for complete search history.

(56) References Cited

U.S. PATENT DOCUMENTS

2007/0262857 A1* 11/2007 Jackson ........................ 340/506
2008/0062258 A1* 3/2008 Bentkovski et al. ............ 348/50
2012/0122418 A1* 5/2012 Hicks, III .................. 455/404.1

* cited by examiner

*Primary Examiner* — Olisa Anwah

(57) ABSTRACT

Disclosed is a Video Alarm Security System (VASS) adapted to transmit image information showing detected alarm events to a communication device of a remote person allowing said person to verify the alarm event before initiating a 3-party call to a PSAP (Public Safety Answering Point) with jurisdiction over the location of said VASS. In one embodiment the 3-party conference call is established using two co-joined and bridged transceivers, A and B, wherein transceiver A is a Wi-Fi transceiver connected to an internet router to establishes an internet video call connection between the VASS and person and B is a cellular telephone transceiver adapted to establishes a bridged call connection between the VASS and PSAP. In another embodiment transceivers A and B are both cellular telephone transceivers. Methods for establishing 3-party PSAP call connections using ISP (Internet service provider) or cellular telephone company provided conference calling services are also disclosed.

8 Claims, 4 Drawing Sheets

FIG. NUMBER 1
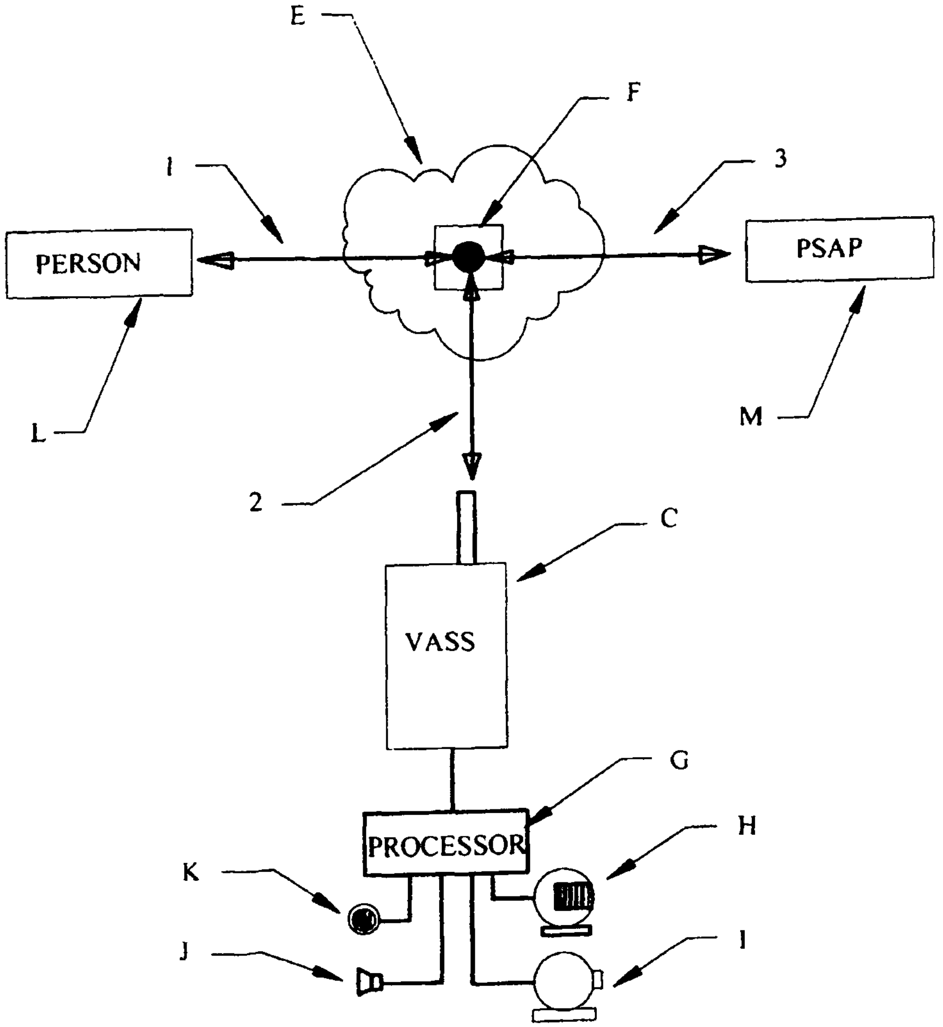

FIG. NUMBER 2
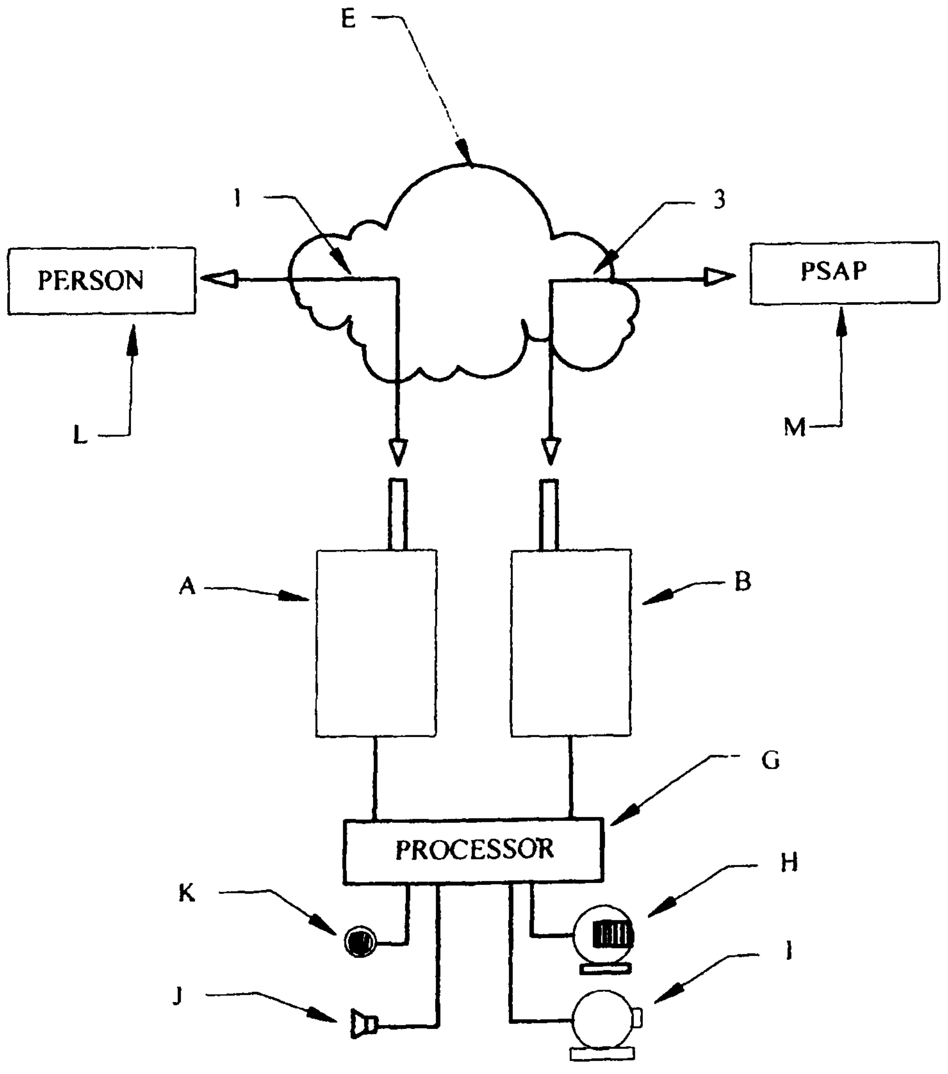

FIG. NUMBER 3
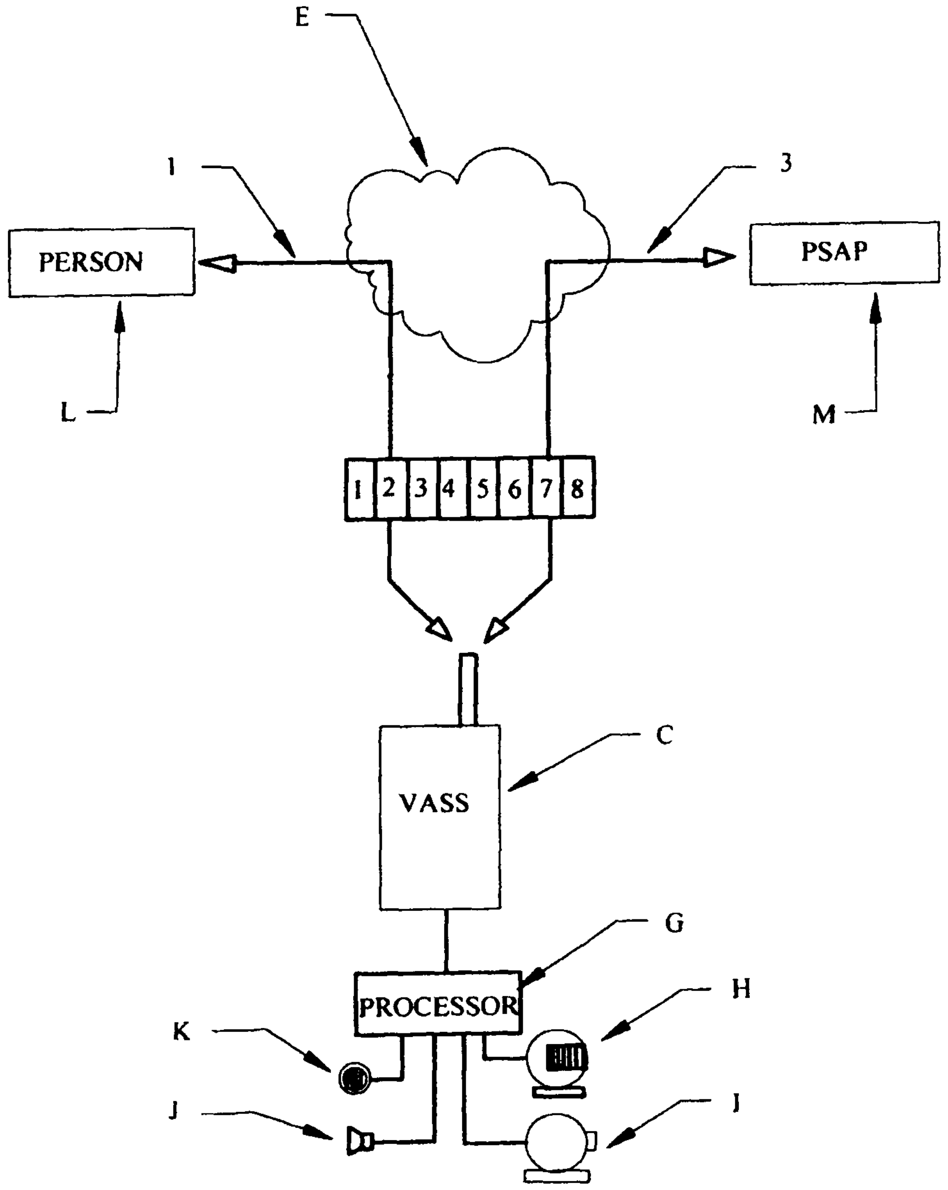

FIG. NUMBER 4
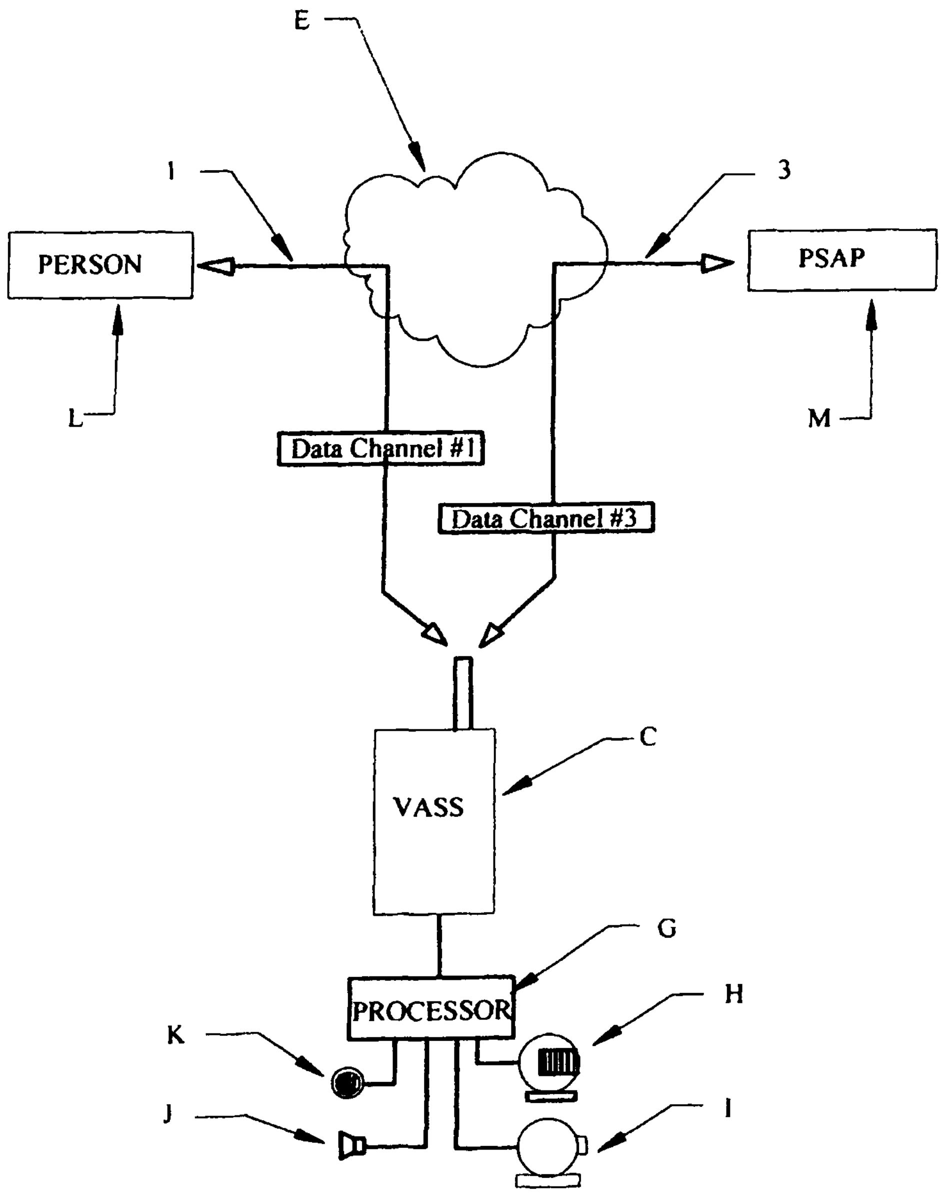

VIDEO ALARM SECURITY SYSTEM WITH 3-PARTY 9-1-1 CALLING

FIELD OF THE INVENTION

The present invention in general relates to Video Alarm Security Systems and more particularly to a Video Alarm Security System (VASS) with connected cellular transceivers, cameras, microphones, speakers, event detection sensors, and memory storage media under microprocessor control that are protecting residential, commercial and mobile properties. Wherein a camera connected to the VASS is adapted to capture image information showing detection of predetermined alarm events in the vicinity of the VASS and to transmit said camera captured image information to a telephone, or computer, of a remote person so that said person can verify that the event is a valid alarm event detection before establishing a 3-party conference call connection via the VASS with a PSAP (Public Safety Answering Point) having jurisdiction over the location of said VASS and requesting emergency services at the location of said VASS.

In a preferred embodiment of the present invention the VASS establishes a 3-party conference call connection with a PSAP having jurisdiction over the location of the VASS using two (2) co-connected transceivers, A and B that are connected to the VASS. In this two (2) transceiver embodiment a first ($1^{st}$) call connection between the person and the VASS is established via VASS transceiver A and a second ($2^{nd}$) concurrent call connection between the VASS and a 9-1-1 call taker is established via VASS transceiver B. The 3-party call connection is then established by the VASS, using hardware or microprocessor call bridging means, so that the person in the first ($1^{st}$) call connection with the VASS, via transceiver A, can tell the 9-1-1 call taker in the second ($2^{nd}$) call connection with the VASS, via transceiver B, the reason for the call and request emergency services at the location of the VASS. Transceivers A and B can operate on the same cellular network, or on different cellular networks. For example, one transceiver can be a GSM transceiver and the other a CDMA or LTE (Long Term Evolution) transceiver or they can both be GSM or CDMA or LTE transceivers.

In another embodiment a 3-party conference call connection between a person, the VASS and a 9-1-1 call taker at a PSAP having jurisdiction over the location of the VASS can be established by the person establishing a first ($1^{st}$) call connection with the VASS and then transmitting a 9-1-1 conference call set-up request to the telephone company network from his personal telephone via the established person to VASS call connection.

In another embodiment the person can establish a first ($1^{st}$) call connection with the VASS and transmit a command instruction to the VASS ordering said VASS to transmit a predetermined dialing sequence to the telephone company network requesting the telephone company network to establish a 3-party conference call connection with a 9-1-1 call taker at a PSAP having jurisdiction over the location of the VASS using telephone company provided conference calling services.

In yet another embodiment the VASS can be programmed to place a first ($1^{st}$) call to the telephone of a predetermined person upon detection of a predetermined alarm event and to transmit camera captured image information to the telephone of said person during said call connection. Said image information allowing said person to verify that the alarm event detection notification is a valid alarm event, and not a false alarm, before establishing a 3-party conference call connection with a PSAP having jurisdiction over the location of the VASS and requesting emergency services at the location of said VASS. In this embodiment the 3-party call connection can be established using two (2) co-joined transceivers with bridged audio or it can be established using telephone company provided conference calling services.

Cellular 9-1-1 call connections can be disrupted (a dropped call) if the cellular phone loses connection with a cell tower during a call connection. When this occurs the 9-1-1 call taker will attempt to reestablish the dropped call connection by placing a return call to the telephone number of the cellular device that made the original 9-1-1 call. However, the VASS of the present invention is an unattended telematics device which means that there is no live person at the VASS to answer an incoming 9-1-1 call-back telephone call. The VASS can be programmed to transfer the 9-1-1 call-back telephone call to the telephone number of a predetermined person using call transfer services provided by a telephone company network, or the VASS can be programmed to auto-answer a 9-1-1 call-back and to voice an audio clip that includes the telephone number of a predetermined person so that the 9-1-1 caller can then call said voiced telephone number of said person to reestablish the dropped call connection.

BACKGROUND OF THE INVENTION

A PSAP (Public Safety Answering Point) is a public safety agency or facility designated by a governmental authority to act as a police, fire or medical services response center. Its function is to expedite emergency 9-1-1 calls by determining the nature of calls for emergency assistance and to connect the caller to the appropriate police, fire, medical or Coast Guard responder agency to provide emergency services at the location of the telephone that is used to call 9-1-1 to request said emergency services.

In the United States, Canada and Mexico dialing 9-1-1 quickly and automatically places the caller in direct contact with a 9-1-1 PSAP call taker having jurisdiction over the location of the caller telephone. There are over six thousand (6000) different PSAP's in the United States each having jurisdiction over a specific geographical area. All 6,000 PSAP's answer to the same 9-1-1 emergency number. By FCC mandate it is the responsibility of the telephone company network to insure that a 9-1-1 call is automatically routed to a PSAP with jurisdiction over the geographic location from which the 9-1-1 call is placed.

To accomplish this automatic 9-1-1 call routing based on caller location the telephone companies maintain a data-base of telephone numbers linked to the physical address of a caller landline telephone and to the telephone numbers of a dedicated 9-1-1 trunk telephone line connecting each PSAP to the telephone company network.

Cellular telephones are nomadic in nature allowing cellular calls to originate from any location. To route cellular calls to a PSAP with jurisdiction over the location from which the cellular call originates telephone companies use the GPS location of the phone or the location of the cell tower through which the cell phone is placing the 9-1-1 call and a data base of PSAP 9-1-1 trunk line telephone numbers linked to the GPS or cell tower location to determine the correct PSAP to which the 9-1-1 call needs to be routed.

The telephone company network knows the telephone number of every cell phone connected to each cell tower on its network. It knows the location of each cell tower on its network and maintains a data base of PSAP telephone numbers of PSAP's having jurisdiction over each cell tower location. The telephone company network is therefore able to correctly route a 9-1-1 call to the correct PSAP to handle the call.

This automatic 9-1-1 call routing capability is critically important in relation to residential and commercial alarm monitoring companies and to private persons using prior-art alarm systems designed to call or text them upon detection of predetermined alarm events such as a fire or burglary event detection. If the person or alarm monitoring company is located in a geographic PSAP jurisdiction different than the alarm system, as is most often the case, a person or alarm monitoring company dialing 9-1-1 to request emergency services at the location of the alarm system will be connected to a PSAP having jurisdiction over the location from which the person, or alarm monitoring company, made the 9-1-1 call rather than with a PSAP with jurisdiction over the location of the alarm system.

Because of this automatic 9-1-1 routing based on the location of the caller telephone prior-art alarm monitoring companies are forced to spend large amounts of money creating and maintaining proprietary 10-digit administrative PSAP telephone number data bases linked to geographical locations and jurisdiction boundaries for each of the six thousand (6000) or more PSAP's in the United States. These 10-digit telephone number databases allow alarm monitoring companies to place standard type telephone calls to the non-9-1-1 10-digit administrative telephone number of a PSAP having jurisdiction over the location of a monitored alarm system. The problem with this solution is that since this call is not a real E9-1-1 call it is not afforded the priority that a real 9-1-1 call would receive and ALI (Automatic Location Information) is not supported. Also a private person receiving a direct auto-dialed alarm notification that is sent to his personal telephone by an alarm system auto-dialer does not normally have access to such a PSAP 10-digit data bases to determine the proper PSAP telephone number to call to request emergency services at the location of the alarm system.

The present invention provides a solution for this problem by replacing the alarm monitoring company with the alarm system owner himself and routing the 9-1-1 call to a PSAP with jurisdiction over the location of the VASS as a 3-party conference call that is initiated by the VASS. This 3-party call can be established using telephone company provided conference calling services or it can be established by establishing a first ($1^{st}$) call connection with a VASS transceiver A and a person and a user commanded second ($2^{nd}$) call connection with a VASS transceiver B and 9-1-1 with the VASS bridging the two call connections so that the person in the first call connection with transceiver A is able to tell the 9-1-1 call-taker in the second call connection with transceiver B the reason for the call and to request emergency services at the location of the VASS.

In summary: The present Invention takes advantage of E9-1-1 automatic call routing and 3-party conference calling to establish a call connection between a person and a PSAP with jurisdiction over the location of a Video Alarm Security System (VASS) protecting a property. The VASS can be protecting a fixed location commercial or residential property in one embodiment or it can be protecting a mobile asset such as a boat, vehicle, aircraft, trailer or shipping container in another embodiment.

RATIONAL FOR THE PRESENT INVENTION

Alarm industry statistics show that U.S. fire departments responded to approximately 369,500 residential structure fires in 2010. These fires caused 13,350 civilian injuries, 2,640 civilian deaths and more than $6.9 billion dollars in direct property damage. There were approximately 2,222,196 burglaries in the United States in 2010 with a cost to property owners and insurance companies of over $4.6 billion dollars.

An estimated 20 million security alarm systems are currently installed in the United States with the security alarm industry adding roughly 1.5 million new security monitoring systems each year. The average security system costs $1,600 and the average monthly monitoring fee is $15-$24 per month. According to alarm industry statistics only 1 out of every 9 U.S. residences already have security systems and 60% of new systems are being installed in residences.

This number of new alarm system installations represents a huge potential untapped market for companies providing fire and burglar detection alarm systems and services but it also represents an equally huge problem for police departments because of the large number of false alarms generated by these alarm systems.

Auto-dialing residential and commercial alarm systems that directly dial 9-1-1 at detection of an alarm event have been responsible for so many false alarms that many police departments now refuse to answer a direct to 9-1-1 machine generated alarm call unless the alarm notification is verified by an alarm monitoring company or by the alarm owner himself. In fact there have been so many false alarms that 20 states have passed laws against connecting a 9-1-1 auto-dialing alarm system, with a recorded message, to the public telephone system.

Government statics for 2010 show that US police departments responded to approximately 38 million commercial and residential alarm activations at an estimated annual cost to state and local police departments of $1.5 billion dollars. The vast majority of these alarm calls—between 94 and 98 percent—turned out to be false alarms. Every year in the city of Chicago alone Chicago police departments responds to more than 300,000 alarm activations, 98 percent of which turn out to be false alarms.

This high number of false alarms generated by auto-dialing security systems has resulted in a reluctance by many police departments to respond to automatically generated alarm notifications that are not verified by a live person. Alarm monitoring companies with event responder personnel who can personally verify such alarm activations are very costly and beyond the budgets of most potential customers resulting in large numbers of home owners electing to forgo security systems entirely or to install less effective systems that are only capable of sounding audible alarms in the hope that this will scare a burglar away or draw attention to a fire by a passerby before the fire does too much damage. The problem with noise making alarms is that most people are so accustomed to false alarms sounding that they very often just ignore them.

Another problem with current-art alarm systems is that cellular call connections can be disrupted and dropped. When a 9-1-1 call is dropped the 9-1-1 call takers will try to reestablish the call connection. However, current-art auto-dialing alarm systems are usually unattended (there is no live person available at the alarm system to answer a 9-1-1 call-back telephone call) so a 9-1-1 call back of a dropped call is unsuccessful. The present invention solves this call-back problem, in a preferred embodiment, by programming the VASS to auto-answer an incoming 9-1-1 call-back telephone call and deliver an audio message such as: "9-1-1 caller, you have called an unattended telematics security device. To talk to a live person please call 415-222-1234". Where the telephone number voiced by the VASS in the audio message is the telephone number of the person who ordered the original 3-party 9-1-1 call.

Clearly a new and better method of eliminating false alarms by verifying an alarm event notification and establishing a direct to 9-1-1 call to a PSAP with jurisdiction over the location of an alarm system is needed. The present Video Alarm Security System (VASS) with video alarm event detection notification and 3-party command dialed 9-1-1 conference calling invention provides such a method solving a long felt need and providing a socially beneficial and valuable public service to property owners and police emergency service providers.

DESCRIPTION OF PRIOR ART

Alarm systems are, in general, well known in the prior art. For example, the following patents describe various types of these devices:

| | | |
|---|---|---|
| 5,815,550 | September 1998 | Miller |
| 5,896,565 | April 1999 | Miller |
| 6,014,555 | January 2000 | Tendler |
| 6,028,537 | February 2000 | Suman et al. |
| 6,052,574 | April 2000 | Smith, Jr. |
| 6,154,658 | November 2000 | Caci |
| 6,292,542 | September 2001 | Bilder |
| 6,340,928 | January 2002 | McCurdy |
| 6,366,646 | April 2002 | Miller |
| 6,430,174 | August 2002 | Jennings et al. |
| 6,449,472 | September 2002 | Dixit et al. |
| 6,807,564 | October 2004 | Zellner et al. |
| 6,600,733 | July 2003 | Deng |
| 8,005,456 | August 2011 | Buehler et al. |
| 7,937,066 | May 2011 | Kaltsukis |
| 8,116,723 | Feb 2012 | Kaltsukis |
| 6,282,182 | August 2001 | Pecen |
| 7,558,590 | November 2005 | Baudino |
| 4,908,629 | March 1990 | Apsell et al. |
| 5,021,794 | June 1991 | Lawrence |
| 5,485,163 | January 1996 | Singer et al. |
| 5,652,570 | July 1997 | Lepkofker |
| 5,742,233 | April 1998 | Hoffman et al. |
| 6,067,018 | May 2000 | Skelton et al. |
| 6,243,039 | June 2001 | Elliott |
| 6,275,164 | August 2001 | MacConnell et al. |
| 6,362,778 | March 2002 | Neher |
| 6,593,851 | July 2003 | Bornstein |
| 6,693,585 | February 2004 | Macleod |
| 7,084,771 | August 2006 | Gonzalez |
| 7,102,508 | September 2006 | Edelstein et al. |
| 7,330,122 | February 2008 | Derrick et al. |
| 7,437,167 | October 2008 | Kartchner |
| 7,446,664 | November 2008 | White |
| 7,245,704 | July 2007 | Binning |
| 7,598,855 | October 2009 | Scalisi et al. |
| 2002/0186135 | December 2002 | Wagner |
| 2004/0121822 | June 2004 | Kartchner |
| 2004/0203601 | October 2004 | Morriss et al. |
| 2004/0230823 | November 2004 | Zakaria et al. |
| 2005/0014482 | January 2005 | Holland et al. |
| 2005/0153729 | July 2005 | Logan |
| 2009/0131054 | May 2009 | Zang |
| 2007/0155412 | July 2007 | Kaltsukis |
| 2002/0032048 | March 2002 | Kitao et al. |
| 2003/0050039 | March 2003 | Baba et al. |
| 2004/0105529 | June 2004 | Salvucci et al. |
| 2004/0198435 | October 2004 | Gauld et al. |
| 2005/0111630 | May 2005 | Potorny et al. |

FOREIGN PATENT DOCUMENTS

| | | |
|---|---|---|
| 1617639 | January, 2006 | EP |
| 2394147 | November, 2002 | GB |
| 2 407 937 | May., 2005 | GB |

-continued

| | | |
|---|---|---|
| 2409363 | June, 2005 | GB |
| 2005-142875 | June, 2005 | JP |
| WO 95/03553 | February, 1995 | WO |
| WO 96/26614 | August, 1996 | WO |
| WO 02/039643 | May., 2002 | WO |

While the structural arrangements of the above described methods and devices may, at first appearance, have similarities with the present invention, they differ in material respects. These differences are essential for the effective use of the present invention and which admit of the advantages that are not available with prior art For example: Bridging two separate calls to redirect a call connection from one communication device to another communication device is well known in the prior art. Ham radio operators have been bridging ham radio transceivers to telephone lines since at least 1956 to create a “phone patch”. Marine VHF radio to public telephone communications network bridging services are also well known as are police VHF radio call relay services that relay police radio frequency transmissions over telephone networks to police, medical and fire emergency service providers.

Establishing 3-party calls using telephone company provided conference calling services and bridging dual-mode two (2) transceiver cellular radios to establish 3-party conference call connections are also well known in the prior art. However, prior art does not disclose or anticipate a Video Alarm Security System (VASS) transmitting camera captured image information showing a predetermined alarm event detection, such as a fire or burglary event, to a telephone of a remote person so that the remote person can verify the event before establishing a 3-party call connection with a 9-1-1 call taker with jurisdiction over the location of said VASS to request police emergency services at the location of said VASS.

Miller U.S. Pat. No. 5,896,565 discloses a method whereby an ACN (Automatic Crash Notification) system in a vehicle can call a telematics control center (TCS) upon detection of a vehicle crash event and the call center transmitting a command to the cellular radio in the vehicle to establish a 3-party call with a 9-1-1 call taker with jurisdiction over the location of the vehicle using telephone company provided Supplementary Services conferring calling services. However, Miller does not disclose or anticipate a Video Alarm Security System (VASS), protecting a residential or commercial property, detecting a predetermined alarm event and transmitting camera captured image information to the telephone of a remote person so that said remote person can verify that the event detection notification is valid before establishing a 3-party 9-1-1 call with a PSAP having jurisdiction over the location of the VASS and requesting emergency services at the location of the VASS.

Bilder (U.S. Pat. No. 6,292,542) discloses a telephone company established 3-party conference calling method wherein a live person in an established call connection with another live person who suffers a medical emergency event during an established call connection can transmit a predetermined dialing sequence to a telephone company network via his personal telephone requesting the telephone company network to establish a 2nd party conference 3-party call connection with a PSAP having jurisdiction over the location of the remote person suffering the medical emergency. However, Bilder does not disclose or anticipate such a second (2nd) party conference call being established by a remote person in an established call connection with an unattended VASS that does not include a live person at the VASS end of the call connection. Nor does Bilder anticipate a Video Alarm Security System (VASS) that captures image information upon detection of a predetermined alarm event and that transmits said camera captured image information to the telephone of a person wherein said image information allows said person to verify that said event notification is a valid alarm event, and not a false alarm, before establishment of a 3-party 9-1-1 call to request emergency services at the location of the VASS.

Kaltsukis (U.S. Pat. No. 7,937,066) discloses a remote person establishing a first ($1^{st}$) call connection with a remote cellular transceiver and ordering said transceiver to establish a conference call with 9-1-1 via telephone company provided conference calling services. However, the Kaltsukis patent does not disclose a residential or commercial Video Alarm Security System (VASS) using two co-joined transceivers, A and B, to bridge a first call path between a person and the VASS via transceiver A; and a second call path between the VASS and a 9-1-1 call taker established via transceiver B to establish a 3-party call connection so that the person can request emergency services at the location of the VASS. Nor does the Kaltsukis patent disclose a person establishing a first ($1^{st}$) call connection with an unattended VASS and the person himself transmitting a $2^{nd}$ party conference call request to a telephone company network via the established call connection requesting the telephone company network to set-up a 9-1-1 conference call with a PSAP having jurisdiction over the location of the VASS.

Caci, (U.S. Pat. No. 6,154,658) teaches using a Vehicle Information and Safety System (VISC) in a fleet vehicle that uses two separate cellular transceivers A and B, with bridged audio inputs and outputs, to established a first call path between a VISC transceiver, A, and a vehicle fleet headquarters (HQ) and a second call path between VISC transceiver, B, (also in the fleet vehicle) and a 9-1-1 call taker at a PSAP with jurisdiction over the location of the fleet vehicle. However, Caci does not disclose or anticipate a residential or commercial Video Alarm Security System (VASS) with two co-joined cellular transceivers transmitting a video alarm event detection notification to a remote person and said remote person then establishing a 3-party call connection with a 9-1-1 call taker having jurisdiction over the location of the residential or commercial property via the two (2) transceivers connected to the VASS.

Baudino (U.S. Pat. No. 7,558,590) discloses using a dual-mode communication device with a first cellular transceiver modem (A) for operation on a first cellular network and a second modem (B) for operation on a second cellular network with the audio inputs and outputs of the two modems, A and B, bridged together to establish a 3-party call connection. However, Baudino does not disclose or anticipate adding a camera, microprocessor and event detection sensors to such a dual-modem communication device to create a Video Alarm Security System nor placing a user initiated 9-1-1 call to request emergency services at the location of the dual-mode communication device.

Buehler (U.S. Pat. No. 8,005,456) discloses using two co-joined cellular transceivers, A and B, to establish a 3-party call connection with a 9-1-1 call taker to track the location of a person or an asset attached to said transceivers. However, Buehler does not disclose or anticipate using dual transceivers, A and B, connected to a camera, event detection sensors and a microprocessor in a residential or commercial Video Alarm Security System (VASS) to establish a 3-party call connection with a 9-1-1 call taker so that the person can report a fire or burglary event at the location of the VASS and request emergency services at the location of the VASS.

Pecan (U.S. Pat. No. 6,282,182) discloses using a Dual Transfer Mode (DTM) cellular communications device to establishing and maintaining two concurrent communication paths, A and B, using different time slots of a GSM cellular traffic channel. However, Pecan does not disclose a VASS protecting a residential or commercial property no establishing a 3-party 9-1-1 call to request emergency services at the location of a VASS.

Deng (U.S. Pat. No. 6,600,733) discloses establishing a Circuit Switched (CS) voice call connection and a concurrent IP packet data (PD) call connection via a cellular telephone and bridging the voice and data connections to establish a 3-party conference call connection. However, Deng does not disclose adding a camera and event detection sensors or transmitting camera captured event detection information to the telephone or computer of a remote person. Nor does he disclose or anticipate establishing a 3-party conference call connection with a 9-1-1 call taker so a remote person can request emergency police services at the location of the cellular telephone that establishes the 3-party call connection.

It is anticipated that future communication systems, such as Satellite telephone systems, VoIP, WiFi, WiMAX, CDMA (Code Division Multiple Access) and Long Term Evolution (LTE) networks will be developed that will be adapted to support a single transceiver establishing 2 concurrent call path, call connections, over a single cellular transceiver operating on a single telephone company cellular radio traffic channel and that these systems will be able to establish 3-party call connections by the communication device itself bridging the two (2) concurrent call connection call paths. Such future solutions are therefore to be considered as additional embodiments of the current invention.

PREFERRED EMBODIMENTS OF THE PRESENT INVENTION

The preferred embodiment of the present invention is a Video Alarm Security System (VASS) protecting a residential or commercial property. Wherein said VASS is connected to two (2) co-joined cellular transceivers, A and B, a camera (or cameras) and event detection sensors. Wherein said VASS is under microprocessor control and adapted to detect predetermined alarm events, such as a fire or burglary event, and automatically transmit camera captured image information of said event detection to the telephone or computer of a remote person. The image information can be is still pictures, a series of still pictures, streaming video, a MMS (Multimedia Messaging Service) Video Clip or video Email format. Transmitting image information in MMS video clip format is the preferred embodiment. Wherein reception of said alarm detection notification image information allows a remote person to verify that said event detection notification is a valid alarm event detection, and not a false alarm, so that said person can then establish a first ($1^{st}$) call connection call path with said VASS via cellular transceiver A. Wherein said established first ($1^{st}$) call connection provides a means whereby said person can transmit a command instruction to said VASS ordering said VASS to dial 9-1-1 and establish a concurrent second ($2^{nd}$) call connection call path via transceiver B with a 9-1-1 call taker at a PSAP having jurisdiction over the location of the VASS; and at establishment of the 9-1-1 call connection said VASS bridging said first call connection call path between said person and said VASS via transceiver A and said second established call connection call path between said VASS and said 9-1-1 call take via transceiver B so that said person can explain the reason for the call to said 9-1-1 call taker and request emergency services at the location of said VASS.

Another embodiment of the present invention that can establish a 3-party conference call between a person, a VASS and a 9-1-1 call taker is to use a single transceiver connected to said VASS to establish two concurrent call paths, A and B, via different time-slots of a radio traffic call channel and said VASS bridging the two concurrent call paths, A and B, via hardware or microprocessor call bridging means to establish a 3-party conference call connection between said person, said VASS and said 9-1-1 call taker so that said person can tell said 9-1-1 call taker the reason for the call and request emergency services at the location of said VASS Another embodiment is to use a single CDMA or LTE (Long Term Evolution) transceiver connected to the VASS to establish two concurrent call paths via separate, but concurrent, data packet call paths wherein one call path is addressed to a remote person and the other call path is addressed to a 9-1-1 call taker to establish two (2) concurrent call paths over the same radio traffic call channel; and wherein said VASS bridges the two (2) call paths using a hardware or microprocessor call bridging means to establish a 3-party call connection so that said person can tell said 9-1-1 call taker the reason for the call and request emergency services at the location of said VASS.

Another embodiment of the present invention that can establish a 3-party conference call connection between a person, a VASS and a 9-1-1 call taker having jurisdiction over the location of said VASS is for the person to establish a first call connection with the VASS; and during said active first ($1^{st}$) call connection said person transmitting a predetermined dialing sequence (via his personal telephone) to the telephone company network requesting said telephone company network to establish a 3-party 9-1-1 call connection via telephone company provided second party ($2^{nd}$ party) conference calling services with a PSAP having jurisdiction over the location of said VASS so that said person can explain the reason for the call to said 9-1-1 call taker and request emergency services at the location of said VASS.

An additional embodiment of a telephone company network established 9-1-1 3-party conference call is for the person to establish a first ($1^{st}$) call connection with the VASS and for said person to transmit a command instruction to said VASS ordering said VASS to transmit a predetermined dialing sequence to a telephone company network wherein said dialing sequence is predetermined to result in said telephone company network establishing a 3-party conference call connection between the telephone of said person, said VASS and said 9-1-1 call taker with jurisdiction over the location of said VASS.

The VASS of the present invention would preferably be adapted to transmit, and to stop transmitting, image information during an established call connection by remote command. Dual Tone Multi Frequency (DTMF) commands are the preferred remote control method for image information transmission turn-on and turn-off. Detection of the DTMF commands by the VASS can be by a connected DTMF decoder chipset or by microprocessor DTMF detection software code.

OBJECTIVES AND ADVANTAGES OF THE PRESENT INVENTION

A primary objective of the present invention is to provide a means whereby an unattended VASS protecting a residential, commercial or mobile property can detect a predetermined alarm event, capture image information showing said alarm event detection, and transmit said image information to a telephone or computer of a remote person so that said person can verify that said event detection notification is a valid alarm event, and not a false alarm, before initiating a 3-party 9-1-1 call to request emergency services at the location of said VASS.

Another objective is to provide a means whereby a remote person can establish a first call connection with a VASS by transmitting a text, data or SMS (Short Message Service) to said VASS ordering it to call his telephone number.

Another objective of the present Invention is to use two (2) co-joined transceivers, A and B, connected to a VASS to establish a 3-party 9-1-1 call connection wherein transceiver A has a Subscriber Identification Module (SIM) for the first ($1^{st}$) person to VASS call connection and wherein transceiver B is unregistered and SIM-less and is used only to establish a second ($2^{nd}$) VASS to 9-1-1 call connection (as is allowed by FCC mandate) and wherein the two call paths A and B are bridged by the VASS to establish a 3-party conference call with a 9-1-1 call taker.

Another objective of the present Invention is to provide a VASS that is adapted to transmit image information to at least one of the person or the 9-1-1 call taker during an established 3-party 9-1-1 call connection Another objective of the present invention is to provide a VASS that is adapted to activate and deactivate, by remote control command, equipment such as cameras, microphones, lights, door locks and thermostats connected to the VASS by wired or RF (Radio Frequency) connections and to turn the VASS security alarm system on and off by remote control.

Further objects and advantages of the present invention will become apparent from a consideration of the drawings and descriptions.

BRIEF DESCRIPTION OF DRAWINGS

For the purpose of illustrating the invention, there are shown in the accompanying drawings forms that are presently preferred; it being understood that the invention is not intended to be limited to the precise arrangements and instrumentalities shown.

FIG. 1 is a schematic representation of a Video Alarm Security System (VASS) embodiment of the present invention showing a 3-party call bridge that is established by a telephone company network via telephone company provided conference calling Supplementary Services. The network established call bridge allowing a person in an established call connection with the VASS, via call connection call paths 1 and 2, to talk to a 9-1-1 call taker in an established call connection call path 3. Network call bridge, F, bridges call paths 1, 2 and 3 to establish the 3-party call connection allowing the person, L, to talk with the 9-1-1 call taker, M.

In one embodiment the telephone company network establishes a call bridge between call connection call paths 1, 2 and 3 at reception of a call bridge request originating from the VASS, C, via call path 2.

In another embodiment the telephone company network sets up the call bridge between the person, the VASS and a 9-1-1 call taker having jurisdiction over the location of the VASS upon reception of a call bridge request from the person, L, via call path 1.

In both embodiments the telephone company network establishes a call bridge between the person to VASS call connection and a 9-1-1 call taker so that the person, L, can converse with the 9-1-1 call taker, M.

FIG. 2 is a schematic representation of a Video Alarm Security System (VASS) comprising two separate transceivers, A and B, to establish a first call connection via transceiver A between a remote person, L, and the VASS via call path, 1, and a second (2nd) call connection via transceiver B between the VASS and a 9-1-1 call taker, M, at a PSAP with jurisdiction over the location of the VASS via call path 3; wherein the VASS bridges the two (2) established call connection call paths, 1 and 3, by hardware or microprocessor call bridging means, to establish a 3-party conference call connection allowing the remote person, L, to converse with a 9-1-1 call taker, M, at a PSAP with jurisdiction over the location of the VASS.

FIG. 3 is a schematic representation of a Video Alarm Security System (VASS) embodiment of the present invention that establishes a first ($1^{st}$) call connection between a remote person, L, and the VASS via a call connection call path, 1, which is established over one time-slot of a cellular communications channel and a second ($2^{nd}$) call connection call path, 3, between the VASS and a 9-1-1 call taker, M, at a PSAP with jurisdiction over the location of the VASS which is established over a different time-slot of the cellular communications channel. Wherein call connection call path 1 and call connection call path 3 are established over different time-slots of the same cellular communications channel; and wherein the VASS bridges the concurrent call connection call paths, 1 and 3, by hardware or microprocessor call bridging means so that a remote person, L, on call connection call path 1 is able to talk with a 9-1-1 call taker, M, on call connection call path 3.

FIG. 4 is a schematic representation of a Video Alarm Security System (VASS) embodiment of the present invention that establishes two separate, but concurrent, call connection call paths, 1 and 3, with a remote person, L, via call connection call path 1 and a 9-1-1 call taker, M, with jurisdiction over the location of the VASS via call connection call path 3; and wherein call connection call paths 1 and 3 are established using IP data packet protocols; wherein call connection call path 1 and call connection call path 3 are bridged by said VASS by hardware or microprocessor means so that a person, L, on call connection call path 1 can converse with a 9-1-1 call taker, M, on call connection call path 3.

DRAWING REFERENCE NUMBERS

A is one of two (2) bridged cellular transceivers connected to a VASS.
B is one of two ($2^{nd}$) bridged cellular transceivers connected to a VASS.
C is a wireless transceiver connected to a VASS.
D is the VASS components A, B, C, G, H, I, and K comprising the VASS (D is not shown in drawings).
E is a cellular telephone company telephone network.
F is a conference call bridging means provided by the telephone company network.
G is a microprocessor.
H is an event detection sensor, or sensors, connected to the VASS.
I is a camera, or cameras, connected to the VASS.
J is an audio speaker connected to the VASS.
K is a microphone connected to the VASS.
1 is a call connection, call path, connecting a person, L, to a telephone company network, E
2 is a call connection, call path, connecting a telephone company network, E, to a VASS transceiver C.
3 Is a call connection, call path, connecting a PSAP, M, to a telephone company network E.

EXPLANATION OF DRAWINGS

Drawing 1

A person, L, receives a video e-mail or MMS video clip showing camera captured image information of detected fire or burglary alarm event detections by a Video Alarm Security System (VASS) protecting a commercial or residential property. Said person upon reaching a determination that said alarm event detection notification is a valid alarm event, and not a false alarm, establishes a call connection with said VASS and transmits a command to said VASS ordering it to call 9-1-1 and establish a 3-party conference call with a 9-1-1 call taker at a PSAP with jurisdiction over the location of said VASS via telephone company provided conference calling services. The first call connection between said person and said VASS can be established by said person calling the telephone number or said VASS, or by said person, L, transmitting a text, data or SMS command to said VASS ordering said VASS to call the telephone number of said person.

In one embodiment of drawing 1 person L transmits a command to said VASS ordering said VASS to transmit a predetermined dialing sequence to the telephone company network notifying said network that a 3-party conference call is required with a 9-1-1 call taker having jurisdiction over the location of said VASS. Said conference call request by said VASS resulting in said telephone company network establishing a 3-party 9-1-1 conference call connection.

In a second embodiment of drawing 1 the person establishes a first call connection with the VASS via a telephone company network and during said established call connection transmits, via his personal telephone, a predetermined dialing sequence, or voiced audio request, to the telephone company network requesting establishment, by said telephone company network, of a 3-party conference call connection with a 9-1-1 call taker at a PSAP having jurisdiction over the location of said VASS so that said person can request emergency services at the location of said VASS.

Drawing 2

Drawing number 2 shows an embodiment of the present invention that uses two co-joined transceivers, A and B, to establish a first ($1^{st}$) call connection call path, number 1, between a remote person L and transceiver A, and a second call connection call path, number 3, between transceiver B and a PSAP 9-1-1 call taker, M. Said second ($2^{nd}$) call connection call path number 3 established by the VASS transceiver B upon reception of a command transmitted by person L during said first ($1^{st}$) call connection with transceiver A; wherein said VASS is programmed to bridge call paths 1 and 3 to establish a 3-party call connection so that said person, L, in said active call connection with transceiver A can talk to said 9-1-1 call taker, M, in said call connection established by transceiver B and request emergency services at the location of said VASS. Wherein said 3-party call connection is established via a hardware or microprocessor call bridging means between transceivers A and B that bridges call paths 1 and 3 so that said person, L, can tell said 9-1-1 call taker, M, the reason for the call and request emergency services at the location of said VASS.

Drawing 3

Drawing number 3 shows an embodiment of the present invention that uses two time-slots of a cellular communications channel to establish two concurrent call paths between a VASS and a remote person, L, via call path, 1 and said VASS and a 9-1-1 call taker at a PSAP with jurisdiction over the location of said VASS via call path 3; and wherein said VASS joins and mixes the two concurrent call paths via a hardware or microprocessor call bridging means to establish a 3-party call connection allowing said person, L, on call path, 1 to converse with said 9-1-1 call taker, M, on call path 3.

Drawing 4

Drawing number 4 shows an embodiment of the present invention that establishes two concurrent but separate call paths by a VASS with a telephone of a remote person, L, and a telephone of a 9-1-1 call taker, M, at a PSAP having jurisdiction over the location said VASS via a communication traffic channel of a cellular network. Wherein the two call paths are established with the telephones of said person, L, and said PSAP, M, via VoIP and IP packet data telephone call protocols.

CONCLUSIONS, RAMIFICATIONS, ALTERNATIVE FORMS

The 3-party 9-1-1 conference call connection of the present invention can be established by a telephone company network via conference calling services provided by the telephone company network upon reception of a conference call set-up request during a $1^{st}$ call connection between a person and a VASS. The request, in a preferred embodiment, can be transmitted from the VASS to the telephone company network at reception of a command from the person. In another embodiment the person can transmit a conference call set-up request to the telephone company network from his personal telephone during an established call connection with a VASS alerting the telephone company network that said person is requesting a conference call connection with a 9-1-1 call taker at a PSAP having jurisdiction over the location of said VASS.

In another embodiment of the present invention a first ($1^{st}$) a second ($2^{nd}$) call connection, call paths, can be established using two separate cellular transceivers, A and B, and the VASS can bridge the first and second call connection, call paths, to establish a 3-party conference call connection with a PSAP having jurisdiction over the location of said VASS. Said call bridge and 3-party 9-1-1 call connection can be established be a hardware or by a microprocessor call bridging means. The transceiver used to establish the first ($1^{st}$) call connection would preferably be a paid subscriber of telephone company services and have a SIM (System Identification Module) card. The second ($2^{nd}$) transceiver can be SIM-less and unregistered and only capable of making 9-1-1 calls as mandated by FCC mandate for an unsubscribed 9-1-1 call.

The VASS in another embodiment could be configured to establish concurrent ($1^{st}$) and second ($2^{nd}$) call connection, call paths, via data packets addressed to the person, L, and to a 9-1-1 call taker, M, via the same cellular IP transmission channel and the VASS adapted to bridge the information transmitted in the two (2) call connection, call paths, using hardware or microprocessor call bridging means to establish a 3-party 9-1-1 call connection so the person, L, can converse with the 9-1-1 call taker, M, and request emergency services at the location of the VASS.

While the present invention has been shown and described with reference to particular embodiments it will be understood by those skilled in the art that various changes may be made and equivalents substituted without departing from the broad scope of the invention. In addition, many modifications may be made to adapt a particular situation to the teachings of the invention without departing from the essential scope thereof. Therefore, it is intended that the invention not be limited to the particular embodiments disclosed herein, but that the invention will include all embodiments falling within the scope of the appended claims. Thus the scope of the invention shall be determined by the appended claims and their legal equivalents, rather than by the examples given.

What is claimed is:

1. A method for detection of predetermined alarm events by an unattended Video Alarm Security System (VASS) protecting a residential, commercial or mobile property, and for the transmission of camera captured image information showing said alarm event detection to the telephone or computer of a remote person so that said person can verify that said alarm event is a valid alarm event, and not a false alarm, and then establish a 3-party 9-1-1 call with a Public Safety Answering Point (PSAP) having jurisdiction over the location of said VASS and request emergency services at the location of said VASS, comprising:

a. A VASS with a connected cellular transceiver, camera (or cameras) and alarm detection sensors under microprocessor control detecting a predetermined alarm event, capturing image information via said connected camera showing said alarm event detection and transmitting said captured event detection image information to a telephone or computer of a remote person, and b. wherein said image information is transmitted as a picture, a series of pictures, a video stream, an MMS video clip or a Video Email, and c. said person viewing said image information transmitted from said VASS showing said alarm event detection reaching a determination that said alarm event notification is a valid alarm event and not a false alarm and that 9-1-1 emergency services are required at the location of the VASS, and d. said person establishing a first (1.sup.st) call connection with said VASS, and e. during said first (1.sup.st) call connection with said VASS said person transmitting via his personal telephone a predetermined dialing sequence to the telephone company network, via said established call connection, requesting said telephone company network to establish a 3-party conference call connection with a 9-1-1 call taker having jurisdiction over the location of said VASS, and f. said person telling the 9-1-1 call taker the reason for the call and requesting emergency services at the location of said VASS via the established 3-party 9-1-1 call connection.

2. A method for detection of predetermined alarm events by a Video Alarm Security System (VASS) protecting a residential, commercial or mobile property, and for the transmission of camera captured image information showing said alarm event detection to the telephone or computer of a remote person so that said person can verify that said event is a valid alarm event, and not a false alarm, and then establish a 3-party 9-1-1 call with a Public Safety Answering Point (PSAP) having jurisdiction over the location of said VASS and request emergency services at the location of said VASS, comprising:

a. A VASS with two cellular transceivers, A and B, a connected camera (or cameras) and alarm detection sensors under microprocessor control detecting a predetermined alarm event in the vicinity of said VASS; capturing image information showing said alarm event detection, and transmitting said camera captured image information to a telephone or computer of a remote person, and b. wherein said image information is transmitted as a picture, a series of pictures, a video stream, an MMS video clip or a Video Email, and c. said person viewing said image information transmitted from said VASS to verify that said event detection is a valid alarm event, and not a false alarm; reaching a determination that emergency services are needed at the location of said VASS, and d. said person establishing a first call connection with cellular transceiver A of said VASS and transmitting a command instruction ordering said VASS to establish a concurrent 9-1-1 call connection between transceiver B and a 9-1-1 call taker at a PSAP having jurisdiction over the location of said VASS, and e. upon establishment of said 9-1-1 call connection said VASS bridging the active person to VASS call connection, established via transceiver A, and the VASS to 9-1-1 call connection, established via transceiver B, so that said person can tell the 9-1-1 call taker the reason for the call and request emergency services at the location of the VASS.

3. The method of claim 2 Wherein transceiver A is connected to a SIM (Subscriber Identification Module) and is a subscriber of a telephone company service provider and transceiver B is SIM-less and unsubscribed but allowed to make outgoing calls to 9-1-1 by FCC mandate.

4. A method for detection of an alarm event by a Video Alarm Security System (VASS) protecting a residential, commercial or mobile property and for transmission of an alarm event detection notification message to the telephone or computer of a remote person so that said person can then establishing a first ($1^{st}$) call connection with a cellular communications device (CCD) located at the same location as said VASS, but not connected to said VASS, wherein said CCD includes two (2) co-joined cellular transceivers (A and B); wherein transceiver A is configured to auto-answer a first ($1^{st}$) incoming call from said person and transceiver B is configured to establish a second ($2^{nd}$) outgoing call connection with 9-1-1 and wherein said CCD is configured to bridge the first ($1^{st}$) and second ($2^{nd}$) call connections so that said person can explain the reason for the call to the 9-1-1 call-taker and request emergency services at the location of said CCD, comprising:

a. A person receiving an alarm event detection notification message from a Video Alarm Security System (VASS) protecting a residential, commercial or mobile property, and b. said person reaching a determination that emergency services are needed at the location of said VASS, and c. said person establishing a first ($1^{st}$) call connection with a cellular communications device (CCD) located at the same location as said VASS, but not connected to said VASS, wherein said CCD has two co-joined cellular Transceivers (A and B) under microprocessor control and wherein said CCD is programmed to auto-answer an incoming call from said person via cellular transceiver A, and d. said person transmitting a command instruction to said CCD via said first ($1^{st}$) cellular call connection ordering said CCD to establish a second ($2^{nd}$) cellular call connection via transceiver B with a 9-1-1 call-taker at a Public Safety Answering Point (PSAP) having jurisdiction over the location of said CCD, and e. said CCD bridging the first ($1^{st}$) cellular call connection between said person and said CCD established via transceiver A and the second ($2^{nd}$) cellular call connection between said CCD and said 9-1-1 call-taker established via transceiver B so that said person can explain the reason for the call to the 9-1-1 call taker and request emergency services at the location of said CCD.

5. A method for establishing a conference call connection between a Video Alarm Security System (VASS), a Public Safety Answering Point (PSAP) 9-1-1 call-taker and a remote person via two co-joined transceivers (A and B) connected to said VASS; wherein transceiver A is connected to an Internet router via a Wi-Fi connection and to the Internet via said Internet router and wherein transceiver B is connected to a cordless telephone base station via a radio frequency link and said base station is connected to a PSTN (Public Switched Telephone Network), a VoIP (Voice over Internet Protocol) or to a cellular telephone network, comprising:

a. a person receiving a notification message, via his telephone or computer, of an alarm event detection by a Video Alarm Security System (VASS) protecting a residential, commercial or mobile property, and b. said person establishing an Internet connection with said VASS via transceiver A, and viewing image information captured by a camera connected to said VASS showing detection of alarm events in the vicinity of said VASS, and c. said person establishing a bi-directional audio connection with said VASS via said Internet connection, d. said person transmitting a command instruction to said VASS via said Internet connection ordering said VASS to establish a radio frequency link between transceiver B and a cordless telephone base station connected to a PSTN, VoIP or cellular telephone network and to establish a 9-1-1 call connection with a PSAP 9-1-1 call-taker having jurisdiction over the location of said VASS, and e. said VASS bridging the person-to-VASS Internet call connection established via transceiver A and the VASS-to-9-1-1 call connection established via transceiver B so that said person can tell the 9-1-1 call-taker the reason for the call and request emergency services at the location of said VASS.

6. A method for detecting an alarm event by a Video Alarm Security System (VASS) connected to an Internet server and for the transmission of an alarm event detection notification message to a telephone or computer of a remote person so that said person can establish a first ($1^{st}$) internet call connection with said Internet server, view image information transmitted by said VASS to said server to verify that a valid alarm event has occurred in the vicinity of said VASS and then transmit a command instruction to said Internet server, via the first ($1^{st}$) person-to-server call connection, ordering said server to establish a second ($2^{nd}$) Voice Over Internet Protocol (VoIP) 9-1-1 call connection with a Public Safety Answering Point (PSAP) and to bridge the person-to-server call connection and server-to-9-1-1 call connection so that said person can tell the 9-1-1 call-taker the reason for the call and request emergency services at the physical location of said VASS, comprising:

a. a person receiving a notification message, via his telephone or computer, of an alarm event detection by a Video Alarm Security System (VASS) protecting a residential, commercial or mobile property, and b. said person establishing a first ($1^{st}$) Internet call connection with an Internet server connected to said VASS, establishing a bi-directional audio connection with said Internet server and viewing image information transmitted from said VASS to said Internet server showing alarm events occurring in the vicinity of said VASS, c. said person reaching a determination that emergency 9-1-1 services are needed at the location of said VASS, and d. said person transmitting a command instruction to said Internet server, via said first ($1^{st}$) call connection, ordering said server to establish a second ($2^{nd}$) VoIP call connection with a PSAP 9-1-1 call-taker having jurisdiction over the physical location of said VASS, and e. said Internet server bridging the first ($1^{st}$) and second ($2^{nd}$) call connections so that the person on the first ($1^{st}$) person-to-server call connection can tell the 9-1-1 call-taker on the second ($2^{nd}$) server-to-9-1-1call connection the reason for the call and request emergency services at the physical location of said VASS.

7. Claim 6 wherein the Internet server 9-1-1 call is established via emergency 9-1-1 call routing services provided by a VoIP service provider and wherein a registered physical location for the Video Alarm Security System (VASS) is used by said VoIP service provider to correctly route the 9-1-1 call to a PSAP having jurisdiction over the physical location of said VASS.

8. Claim 6 wherein the Internet server 9-1-1 call is established via emergency 9-1-1 call routing services provided by a VoIP service provider and wherein the physical location of the Video Alarm Security System (VASS) is provided by the person to the VoIP service provider via the first ($1^{st}$) and second ($2^{nd}$) bridged call connection and used by said VoIP service provider to correctly route the 9-1-1 call to a PSAP having jurisdiction over the physical location of said VASS.

* * * * *